(12) United States Patent
Alokby

(10) Patent No.: US 7,280,334 B2
(45) Date of Patent: Oct. 9, 2007

(54) INTEGRATED PROCESSOR/MOTHERBOARD SHORT DETECT AND SAFEGUARD MECHANISM

(75) Inventor: Ahmed Alokby, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 10/879,322

(22) Filed: Jun. 29, 2004

(65) Prior Publication Data

US 2005/0286193 A1   Dec. 29, 2005

(51) Int. Cl.
*H02H 3/08* (2006.01)
*H02H 9/02* (2006.01)
*H02H 3/00* (2006.01)

(52) U.S. Cl. ........................ 361/93.1; 361/87
(58) Field of Classification Search ............... 361/93.1, 361/87
See application file for complete search history.

(56) References Cited

U.S. PATENT DOCUMENTS

2002/0144036 A1* 10/2002 Osburn et al. .............. 710/104

2003/0195709 A1* 10/2003 Rudrud ........................ 702/64

OTHER PUBLICATIONS

Powercube. "Voltage Regulator Module: VRMS-91-12-36." California: Powercube, 2002.
Intel Corporation. "Voltage Regulator-Down (VRD) 10.1: Design Guide For Desktop LGA775 Socket." Intel Corporation, Jun. 2004.

* cited by examiner

*Primary Examiner*—Stephen W. Jackson
*Assistant Examiner*—Dharti H Patel
(74) *Attorney, Agent, or Firm*—Blakely, Sokoloff, Taylor & Zafman LLP

(57) ABSTRACT

A short detect and safeguard mechanism is incorporated into a processor and/or a motherboard. A processor includes a first power path to receive a VCC voltage and a second power path to receive a VSS voltage. A processor core executes instructions and is coupled to the first and second power paths to receive the VCC and VSS voltages. A short detect circuit is coupled to detect a short between the first and second power paths. If the short detect circuit detects a short, then it generates a short signal. The short signal is received by a voltage identification ("VID") module provided to select the VCC voltage. In response to the short signal, the VID module generates a disable VCC code.

25 Claims, 4 Drawing Sheets

VID CODES
|      | 0 | 1 | 2 | 3 | 4 |
|------|---|---|---|---|---|
| 0.8 V | 0 | 0 | 1 | 0 | 1 |
| 1.2 V | 0 | 1 | 1 | 1 | 0 |
|      |   |   | • |   |   |
|      |   |   | • |   |   |
| OFF  | 1 | 1 | 1 | 1 | 1 |
VCC
↖ 200
FIG. 2
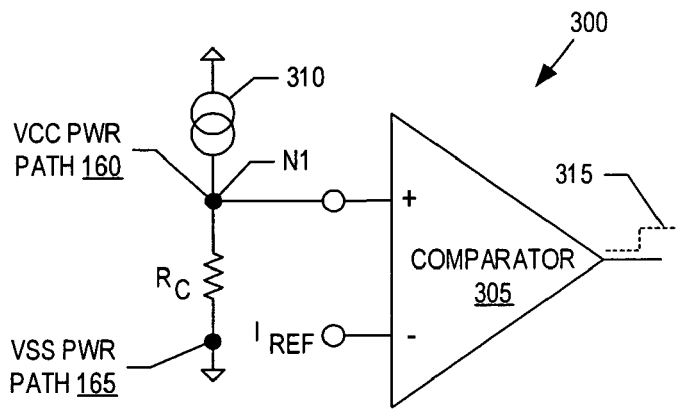
FIG. 3
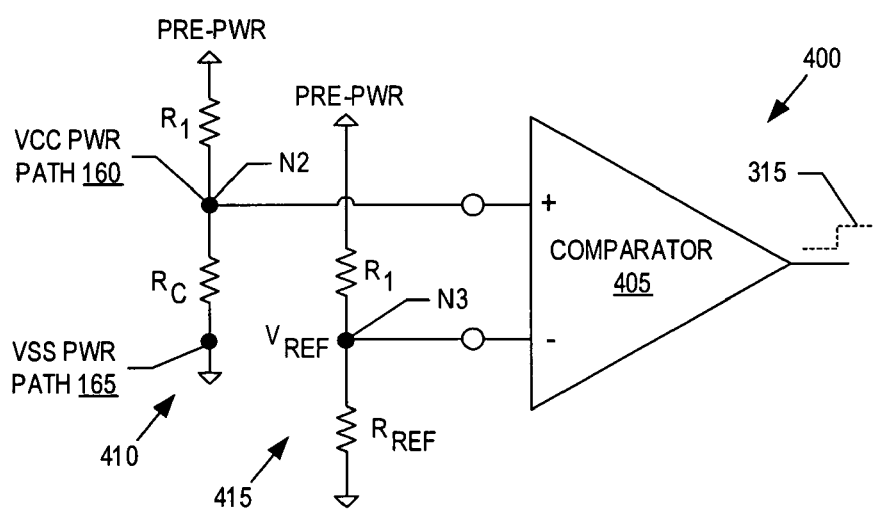
FIG. 4

INTEGRATED PROCESSOR/MOTHERBOARD SHORT DETECT AND SAFEGUARD MECHANISM

TECHNICAL FIELD

This disclosure relates generally to short detect circuits, and in particular, relates to power supply short detection and damage prevention.

BACKGROUND INFORMATION

Electrical shorts between power and ground pins/rails of a processor can cause irreparable damage to the processor and the motherboard. If an end user inadvertently bends one of the power pins while inserting the processor into a pin socket or misaligns a solder bump while mounting the processor to a ball grid array ("BGA") socket, then the user could destroy the processor and/or the motherboard due to a power-ground short.

This bent pin or misaligned solder bump scenario is particularly apt to occur in a processor platform validation ("PPV") test environment. During PPV, the processor is mounted into a test unit using an auto handler. If the auto handler does not accurately take hold of the processor or if the test unit is not squarely positioned, a bent pin or misaligned solder bump may occur. As soon as power is applied to the test unit, the processor may be destroyed due to the high current discharge from power to ground. Typical voltage regulation modules have current protection circuitry that activates at current levels of 150 to 200 Amps to protect the voltage regulator itself. However, a processor may be irreparably damaged at current levels of 4 Amps, if the discharge is through a single lead.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a chart illustrating voltage identification ("VID") codes that may be asserted on VID lines to disable a voltage regulator module, in accordance with an embodiment of the present invention.

FIG. 3 is a circuit diagram illustrating a short detect circuit implemented with a current comparator, in accordance with an embodiment of the present invention.

FIG. 4 is a circuit diagram illustrating a short detect circuit implemented with a voltage comparator, in accordance with an embodiment of the present invention.

DETAILED DESCRIPTION

Embodiments of a system and method for a short detect and safeguard mechanism implemented with a voltage identification ("VID") module and a voltage regulation module ("VRM") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
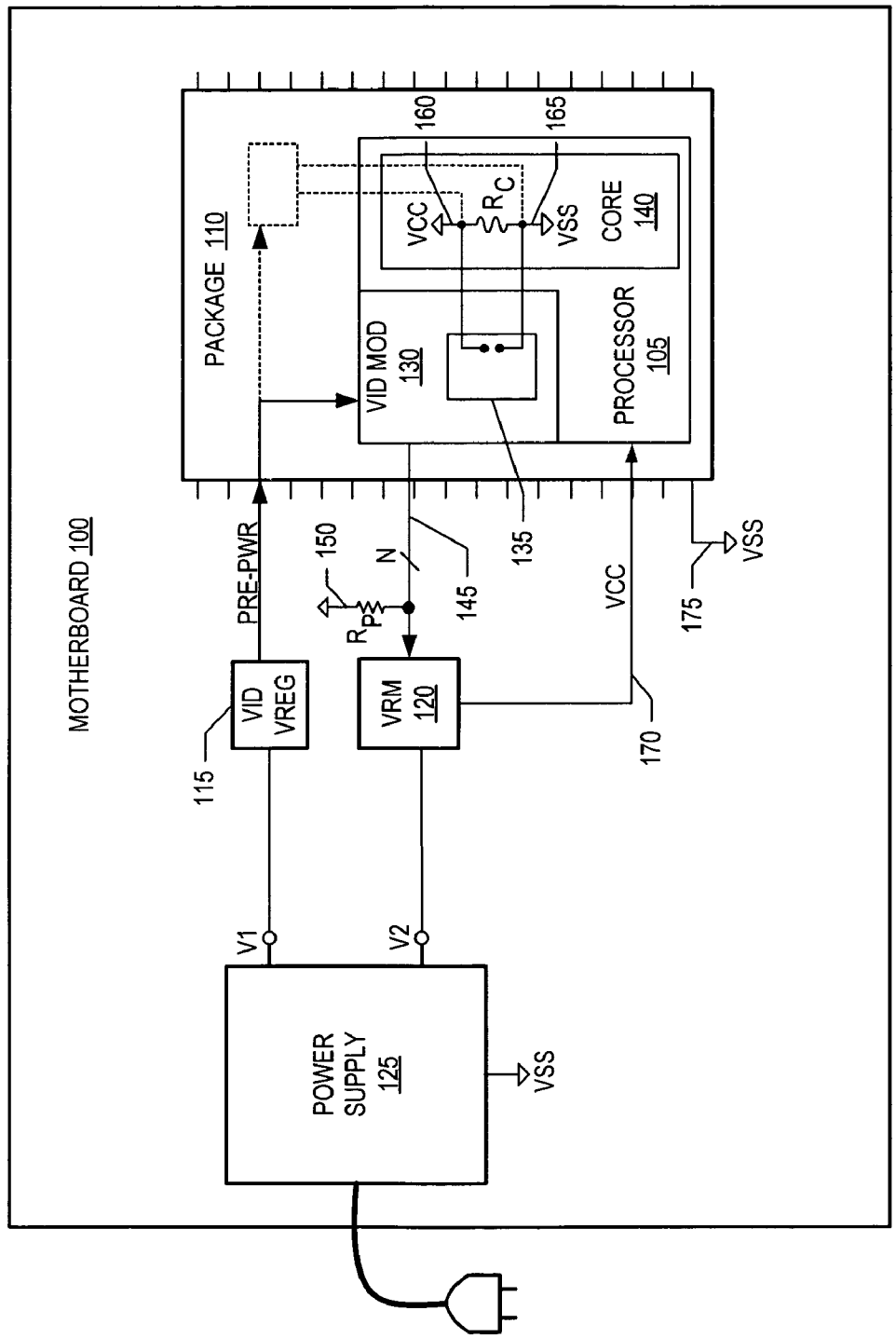
FIG. 1 is a block diagram illustrating a short detect and safeguard mechanism, in accordance with an embodiment of the present invention.

FIG. 1 is a block diagram illustrating a short detect and safeguard mechanism, in accordance with an embodiment of the present invention. The illustrated embodiment includes a motherboard 100, a processor 105, a package 110, a voltage identification ("VID") voltage regulator ("VREG") 115, a voltage regulator module ("VRM") 120, and a power supply 125. The illustrated embodiment of processor 105 includes VID module 130, a short detect circuit 135, a processor core 140.

The components of motherboard 100 are interconnected as follows. Package 110 is mounted to motherboard 110 to electrically coupled processor 105 to VID VREG 115 and VRM 120. Package 110 may be any chip package for housing a processor. For example, package 110 may be a flip chip electrically coupled to a ball grid array ("BGA") on motherboard 110 using solder bumps/balls. Alternatively, package 110 may include traditional pin leads for coupling into a socket array, or the like.

VRM 120 supplies processor 105 with a supply voltage or VCC voltage. The VCC voltage may be coupled into processor 105 along many electrical paths or leads (e.g., solder bumps, pins). In one embodiment, VRM 120 is installable onto motherboard 100 to sense the voltage requirements of processor 105 and to ensure that the correct VCC voltage is maintained. VRM 120 senses the voltage requirements of processor 105 via a VID code communicated on VID lines 145 from VID module 130.

VID VREG 115 supplies processor 105, and in particular VID module 130, a pre-power or an early voltage. This early voltage is guaranteed to be delivered to processor 105 prior to VRM 120 supplying the VCC voltage (e.g., 2 to 5 ms early). Providing the early voltage to VID module 130 enables VID module 130 to power up and operate before the main supply voltage (e.g., the VCC voltage) is applied to processor 105. In this manner, VID module 130 can determine the appropriate VCC voltage to apply to processor 105 and generate the associated VID code on VID lines 145 in time for VRM 120 to read the VID code and apply the correct VCC voltage. In one embodiment, the pre-power supplied by VID VREG 115 may be thought of as a standby power. Although VID VREG 115 is illustrated as disposed on motherboard 100 external to package 110, it should be appreciated that various other embodiments may include VID VREG 115 disposed internal to package 110, either separate from processor 105 or even integrated into processor 105.

Each of VID VREG 115 and VRM 120 are coupled to receive power from power supply 125, which in turn may be plugged into a typical 120V power socket. Power supply 125 is illustrated as generating two supply voltages V1 and V2 (e.g., any of 3.3V, 5V, 12V, and the like); however, it should be appreciated that power supply 125 may be configured to provide more or less supply voltages than illustrated.

FIG. 2 is a chart illustrating representative VID codes 200 that may be asserted onto VID lines 145, in accordance with an embodiment of the present invention. In one embodiment, VID codes 200, VID module 130, and VRM 120 are consistent with a Voltage Regulator-Down ("VRD") Design Guide, Version 10.1, June 2004, or higher, published by Intel Corporation of Santa Clara, Calif. In one embodiment, each VID code 200 may be associated with a unique VCC voltage. VRM 120 interprets each VID code 200 that it receives on VID lines 145 as a request for an associated VCC voltage. For example, "01110" may be associated with 1.2V. In this manner, VID module 130 is capable of requesting a specific operating VCC voltage. Furthermore, VID module 135 may change the one of VID codes 200 asserted to VID lines 145 during operation to provide real-time power stepping or the like.

Referring to FIGS. 1 and 2, a pull up circuit 150 is coupled to VID lines 145 to ensure VID lines 145 default to a logic HIGH value. In this pull up circuit embodiment, a VID code including all logic HIGH values (e.g., "11111") may indicate to VRM 120 to disable the VCC voltage applied to processor 105. Disabling the VCC voltage may include applying a VSS voltage to a VCC power path 160 of processor 105, coupling VCC power path 160 to ground, open circuiting VCC power path 160, or tying VCC power path 160 to a known safe voltage potential. In an alternative embodiment, a pull down circuit is coupled to VID lines 145 to default VID lines 145 to logic LOW values (not illustrated). In this alternative embodiment, a VID code of all logic LOW values (e.g., "00000") may indicate to VRM 120 to disable the VCC voltage. Various other VID codes may be assigned to disable the VCC voltage. Although FIG. 2 illustrates each VID code 200 as being 5 bits wide, VID lines 145 and consequently VID codes 200 may include more or less bits.

Short detect circuit 135 is coupled to sense the circuit resistance $R_C$ between VCC power path 160 and a VSS power path 165 of processor 105. VSS power path 165 represents any return supply path, such as a ground plane or rail and is coupled to VSS power path 175 on motherboard 100. Similarly, VCC power path 160 is coupled to VCC power path 170 on motherboard 100. By measuring the resistance between VCC power path 160 and VSS power path 165 of processor 105, short detect circuit 135 can determine whether a short exists between the two power paths. A short may arise, due to contamination, a design flaw, fabrication flaw, improper mounting of package 110 onto motherboard 100, damage to motherboard 100, and the like. If a short is detected, then short detect circuit 135 generates a short detect signal instructing VID module 130 to assert the disable VCC code (e.g., "11111", "00000", and the like) on VID lines 145.

Since VCC power paths 160 and 170 are electrically coupled together and VSS power paths 165 and 175 are electrically coupled together, short detect circuit 135 is capable of detecting shorts external to the die of processor 105, including shorts on motherboard 100. For example, a short between VCC power path 170 and VSS power path 175 would be detected by short detect circuit 135. Furthermore, although short detect circuit 135 is illustrated as integrated internal to VID module 130, short detect circuit 135 may be located elsewhere on the die of processor 105 (e.g., within core 140), disposed within package 110 but off the die (e.g., element 180), and elsewhere. For example, short detect circuit 135 may be disposed on motherboard 100, as long as, short detect circuit 135 receives pre-power before the VCC voltage is applied to processor 105.

FIG. 3 is a circuit diagram illustrating a short detect circuit 300, in accordance with an embodiment of the present invention. The illustrated embodiment of short detect circuit 300 includes a current comparator 305 and a current source 310. Short detect circuit 300 is one possible implementation of short detect circuit 135.

In one embodiment, current comparator 305 includes a positive input and a negative input. The positive input is coupled to a node N1. Node N1 is in turn coupled to VCC power path 160 and to current source 310. Resistance $R_C$ represents the resistance between VCC power path 160 and VSS power path 165 of processor 105. The negative input of current comparator 305 is coupled to a reference current $I_{REF}$. In one embodiment, $I_{REF}$ may be generated by a current source similar to current source 310.

During operation, current comparator 305 compares the currents received on its positive and negative inputs. In response, current comparator 305 generates/transitions a short detect signal 315 on its output, if a short is detected between VCC power path 160 and VSS power path 165. In one embodiment, a short is detected when the resistance $R_C$ is too low, such that the current flowing through the positive input of current comparator 305 from current source 310 is less than the current $I_{REF}$ flowing into the negative input. The lower the resistance $R_C$, the more current flows across the two power paths and the less current flows into the positive input. Current $I_{REF}$ may be determined with relation to a minimum acceptable resistance $R_C$. Therefore, if resistance $R_C$ drops below this minimum acceptable level, then short detect circuit 300 will determine an improper or erroneous short exists. It should be appreciated that the minimum acceptable resistance $R_C$ and therefore the associated $I_{REF}$ may vary from one processor design to the next.

FIG. 4 is a circuit diagram illustrating a short detect circuit 400, in accordance with an embodiment of the present invention. The illustrated embodiment of short detect circuit 400 includes a voltage comparator 405 and voltage dividers 410 and 415. Short detect circuit 400 is another possible implementation of short detect circuit 135.

In one embodiment, voltage comparator 405 includes a positive input and a negative input. The positive input is coupled to a node N2 and the negative input is coupled to a node N3. Node N2 is coupled to VCC power path 160 within voltage divider 410. When pre-power or early voltage is applied to voltage divider 410 through resistance $R_1$ and resistance $R_C$, a voltage indicative of the ratio of $R_1$ to $R_C$ is established at node N2. Similarly, when the early voltage is applied to voltage divider 415 through resistance $R_1$ and $R_{REF}$, a voltage $V_{REF}$ indicative of the ration $R_1$ to $R_{REF}$ is established at node N3.

During operation, voltage comparator 405 compares the voltages received on its positive and negative inputs. In response, voltage comparator 405 generates/transitions short detect signal 315 on its output, if a short is detected between VCC power path 160 and VSS power path 165. In one embodiment, a short is detected when the resistance $R_C$ drops below the resistance $R_{REF}$, such that the voltage established at node N2 is lower than voltage $V_{REF}$. Resistance $R_{REF}$ and therefore voltage $V_{REF}$ may be determined with relation to a minimum acceptable resistance $R_C$. Therefore, if resistance $R_C$ drops below this minimum acceptable level (i.e., $R_{REF}$), then short detect circuit 400 will determine an improper or erroneous short exists. It should be appreciated that the minimum acceptable resistance $R_{REF}$ and therefore the associated $V_{REF}$ may vary from one processor to the next.

It should further be appreciated that the early voltage or pre-power along with the resistance $R_1$ are selected such that if a short does exists between VCC power path 160 and VSS power path 165, the current generated by the early voltage is sufficiently small so as not to damage processor 105 or motherboard 100. Furthermore, short detect circuits 300 and 400 are only two representative embodiments of short detect circuit 135. Other known or after developed ohmmeters or short detect circuits may be implemented in connection with embodiments of the present invention.

Figure 5:
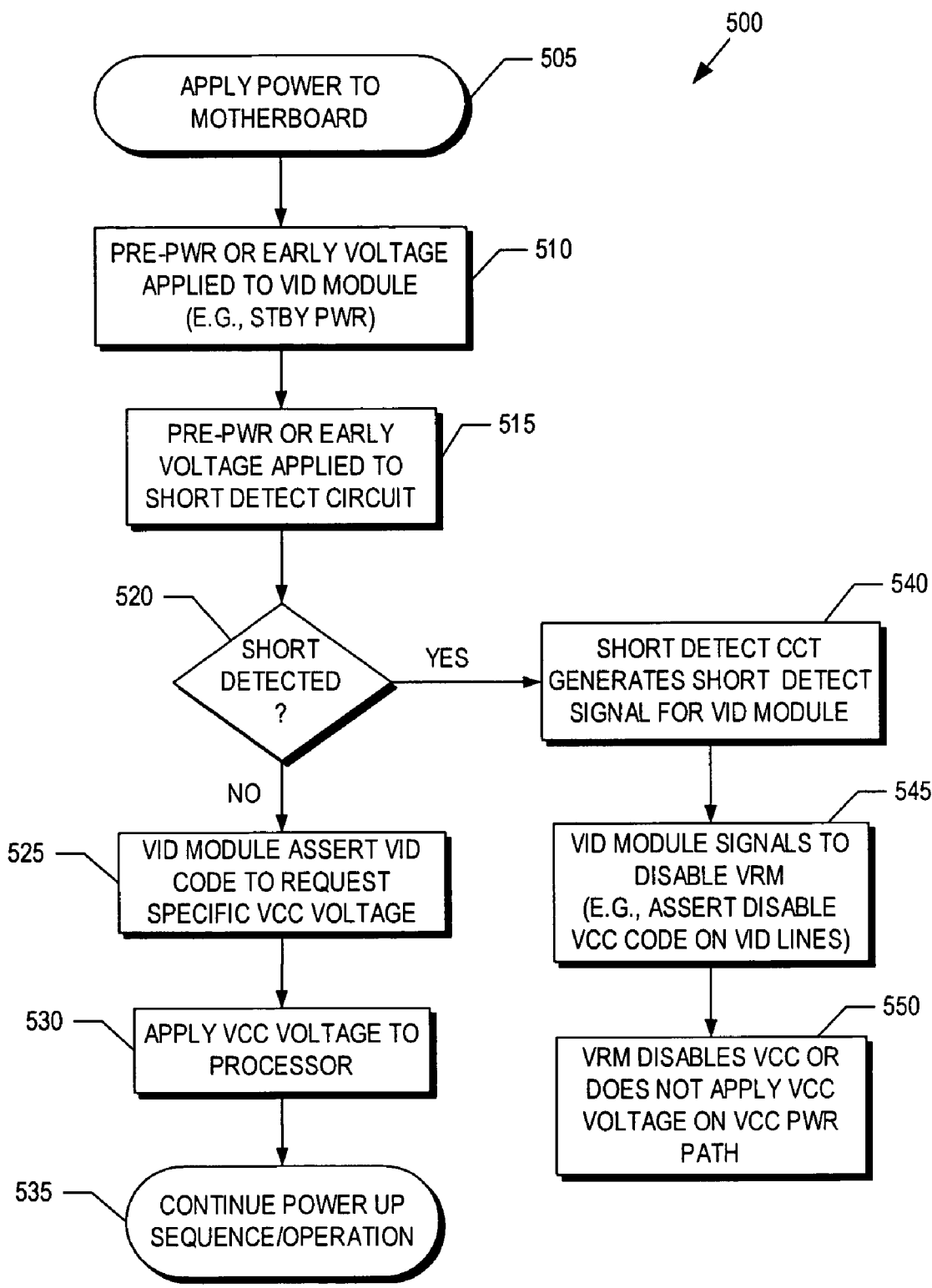
FIG. 5 is a flow chart illustrating a process to implement a short detect and safeguard mechanism, in accordance with an embodiment of the present invention.

FIG. 5 is a flow chart illustrating a process 500 to implement a short detect and safeguard mechanism, in accordance with an embodiment of the present invention. Process 500 explained below is described in terms of computer software and hardware. The order in which some or all of the process blocks appear in process 500 should not be deemed limiting. Rather, one of ordinary skill in the art having the benefit of the present disclosure will understand that some of the process blocks may be executed in a variety of orders not illustrated.

In a process block 505, power is applied to motherboard 100. Power may be applied to motherboard 100 by plugging power supply 125 into a 120V socket or otherwise turning power supply 125 on. In a process block 510, per-power or early voltage is applied to VID module 130 by VID VREG 115. In a process block 515, the pre-power or early voltage is applied to short detect circuit 135. The early voltage enables VID module 130 and short detect circuit 135 to power up before the rest of processor 105. In this manner, short detect circuit 135 can check for a short and instruct VID module 130 to disable VRM 120 before main power is applied to processor 105, should a short be detected. In one embodiment, both short detect circuit 135 and VID module 130 are powered up at the same time via VID VREG 115.

In a decision block 520, short detect circuit 135 senses the resistance across VCC power path 160 and VSS power path 165 to determine whether a short exists. If short detect circuit 135 determine no short exists, then process 500 continues to a process block 525. In process block 525, VID module 130 asserts a VID code onto VID lines 145 to request a specific VCC voltage from VRM 120. In process block 530, VRM 120 applies the requested VCC voltage on VCC power path 170. In one embodiment, VRM 120 waits a pre-determined period of time after the pre-power or early voltage is applied to VID module 130 and short detect circuit 135 before sensing VID lines 145 and applying the VCC voltage. Waiting a finite period of time gives the VID code asserted on VID lines 145 opportunity to be validly asserted. Finally, in a process block 535, the power up sequence is continued (e.g., load and run built in self test and operating system).

Returning to decision block 520, if short detect circuit 135 determines that a short does exist, then process 500 continues to a process block 540. In process block 540, short detect circuit 135 generates short detect signal 315 (see FIGS. 3 and 4) to indicate to VID module 130 that a short has been detected between VCC power path 160 and VSS power path 165. In a process block 545, VID module 130 signals VRM 120 to disable or prevent application of the VCC voltage to processor 105 by asserting the disable VCC code on VID lines 145. In one embodiment, the disable VCC code includes all logic HIGH values (e.g., "11111"). In a process block 550, VRM 120 either disables the VCC voltage, if processor 105 is in current operation and the VCC voltage is already applied, or prevents the application of the VCC voltage to processor 105 if the VCC voltage has not yet been applied. In this manner, short detect circuit 135, VID module 130, and VRM 120 cooperate together to act as both a circuit breaker and a preemptive short detect and disable safeguard mechanism.

Figure 6:
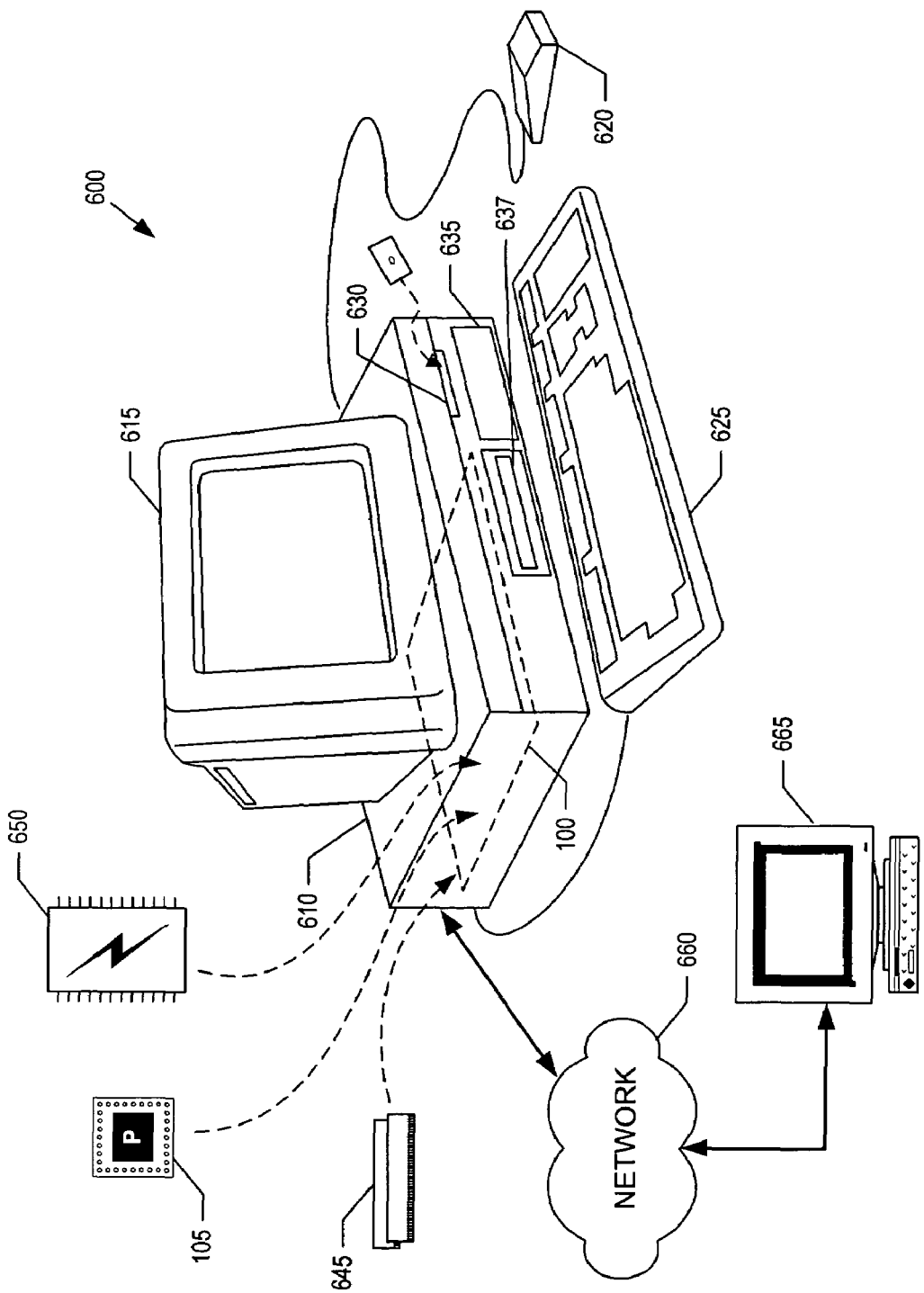
FIG. 6 illustrates a demonstrative computer system for implementing embodiments of the present invention.

FIG. 6 is a diagram of a demonstrative system 600 for implementing embodiments of a short detect and safeguard mechanism as described above. The illustrated embodiment of system 600 includes a chassis 610, a monitor 615, a mouse 620 (or other pointing device), and a keyboard 625. The illustrated embodiment of chassis 610 further includes a floppy disk drive 630, a hard disk 635, a compact disc ("CD") and/or digital video disc ("DVD") drive 637, a power supply (not shown), and motherboard 100 populated with appropriate integrated circuits including system memory 645, nonvolatile ("NV") memory 650, and one or more processor(s) 105.

Processor(s) 105 is communicatively coupled to system memory 645, NV memory 650, hard disk 635, floppy disk drive 630, and CD/DVD drive 637 via a chipset on motherboard 100 to send and to receive instructions or data thereto/therefrom. In one embodiment, NV memory 650 is a flash memory device. In other embodiments, NV memory 650 includes any one of read only memory ("ROM"), programmable ROM, erasable programmable ROM, electrically erasable programmable ROM, or the like. In one embodiment, system memory 645 includes random access memory ("RAM"), such as dynamic RAM ("DRAM"), synchronous DRAM, ("SDRAM"), double data rate SDRAM ("DDR SDRAM") static RAM ("SRAM"), and the like. Hard disk 635 represents any storage device for software data, applications, and/or operating systems, but will most typically be a nonvolatile storage device. Hard disk 635 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

In one embodiment, a network interface card ("NIC") (not shown) is coupled to an expansion slot (not shown) of motherboard 100. The NIC is for connecting system 600 to a network 660, such as a local area network, wide area network, or the Internet. In one embodiment network 660 is further coupled to a remote computer 665, such that system 600 and remote computer 665 can communicate.

As described above, short detect circuit 135 and VID module 130 may be integrated into processor 105 along with other logic elements (e.g., processor core 140). Descriptions of short detect circuit 135 and VID module 130 may be generated and compiled for incorporation into processor 105 or other various application specific integrated circuits ("ASICs"). For example, behavioral level code describing processor 105, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe embodiments of processor 105.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a first power path to receive a VCC voltage;
a second power path to receive a VSS voltage;
processor core to execute instructions, the processor core coupled to the first and second power paths to receive the VCC and VSS voltages;
a short detect circuit coupled to detect a short between the first and second power paths and to generate a short signal if the short is detected; and
a voltage identification ("VID") module to generate VID codes, the VID codes to select the VCC voltage, the VID module coupled to receive the short signal from the short detect circuit and to generate a disable VCC code in response to the short signal, wherein the disable VCC code is one of the VID codes.

2. The apparatus of claim 1, further comprising a pre-power input to receive an early voltage before the VCC voltage is received on the first power path, the pre-power input coupled to power the short detect circuit and the VID module.

3. The apparatus of claim 2, wherein the short detect circuit comprises:
a first voltage divider circuit coupled to receive the early voltage, the first voltage divider circuit including a circuit resistance between the first and second power paths;
a second voltage divider circuit to generate a reference voltage; and
a voltage comparator having a first input coupled to the first power path and a second input coupled to receive the reference voltage from the second voltage divider circuit, the voltage comparator to generate the short signal.

4. The apparatus of claim 2, wherein the short detect circuit comprises:
a current source to generate a test current and coupled to drive a first portion of the test current through the first and second power paths; and
a current comparator having a first input coupled to receive a second portion of the test current and having a second input coupled to receive a reference current, the current comparator to generate the short signal.

5. The apparatus of claim 2, wherein the short detect circuit is integrated into the VID module.

6. The apparatus of claim 2, wherein the short detect circuit is external to a processor die including the processor core and disposed within a package housing the processor die.

7. The apparatus of claim 2, further comprising:
a motherboard to support a package housing the processor core;
a power supply to provide power;
VID lines coupled to the VID module to communicate the VID codes thereon; and
a voltage regular module ("VRM") to receive the power from the power supply and to generate the VCC voltage, the VRM coupled to the VID lines to receive the VID codes and to select the VCC voltage in response to the VID codes, the VRM coupled to disable the VCC voltage from the first power path in response to receiving the disable VCC code.

8. The apparatus of claim 7, further comprising a pull up circuit coupled to the VID lines to default the VID lines to logic HIGH values, wherein the disable VCC code comprises all logic HIGH values.

9. The apparatus of claim 7, further comprising a pull down circuit coupled to the VID lines to default the VID lines to logic LOW values, wherein the disable VCC code comprises all logic LOW values.

10. The apparatus of claim 7, wherein disabling the VCC voltage from the first power path comprises apply the VSS voltage to both of the first and second power paths.

11. The apparatus of claim 7, wherein the short detect circuit is disposed on the motherboard external to the package housing the processor core.

12. A method, comprising:
applying power to a motherboard having a processor thereon;
applying a pre-power voltage to a voltage identification ("VID") module of the processor and to a short detect circuit;
determining whether a first short exists between a VCC power path and a VSS power path of the processor via the short detect circuit;
signaling to the VID module that the first short exists, if the determining determined that the first short exists; and
signaling to a voltage regulator module ("VRM") from the VID module not to apply a VCC voltage to the VCC power path, if the determining determines that the first short exists.

13. The method of claim 12, wherein signaling to the VRM not to apply the VCC voltage comprises communicating a disable VCC code from the VID module of the processor to the VRM along VID lines coupling the VID module to the VRM.

14. The method of claim 13, wherein the disable VCC code comprises all logic HIGH values.

15. The method of claim 13, further comprising:
detecting whether a second short occurs during operation of the processor; and
signaling to the VRM via the VID lines to remove the VCC voltage from the VCC power path, if the detecting detects the second short.

16. The method of claim 13, further comprising:
communicating a particular VID code from the VID module to the VRM to select the VCC voltage, if the determining determines that a short does not exists between the VCC power path and the VSS power path of the processor; and
applying the VCC voltage to the VCC power path in response to the particular VID code.

17. A machine-accessible medium having a description of an integrated circuit thereon, the integrated circuit comprising:
a first power path to receive a VCC voltage;
a second power path to receive a VSS voltage;
processor core to execute instructions, the processor core coupled to the first and second power paths to receive the VCC and VSS voltages;

a short detect circuit coupled to detect a short between the first and second power paths and to generate a short signal if the short is detected; and a voltage identification ("VID") module to generate VID codes, the VID codes to select the VCC voltage, the VID module coupled to receive the short signal from the short detect circuit and to generate a disable VCC code in response to the short signal, wherein the disable VCC code is one of the VID codes.

18. The machine-accessible medium of claim 17, wherein the integrated circuit further comprises a pre-power input to receive an early voltage before the VCC voltage is received on the first power path, the pre-power input coupled to power the short detect circuit and the VID module.

19. The machine-accessible medium of claim 18, wherein the short detect circuit is integrated into the VID module.

20. A system, comprising:
a motherboard;
a voltage regulator module ("VRM") disposed on the motherboard to regulate a VCC voltage;
voltage identification ("VID") lines disposed on the motherboard and coupled to the VRM, the VRM to disable the VCC voltage in response to receiving a disable VCC code on the VID lines;
synchronous dynamic random access memory ("SDRAM") disposed on the motherboard; and
a processor mounted on the motherboard and coupled to access the SDRAM, the processor including a short detect circuit coupled to a VID module, the short detect circuit coupled to generate a short signal in response to detecting a first short between first and second power paths of the processor, the VID module coupled to communicate the disable VCC code to the VRM via the VID lines in response to the short signal.

21. The system of claim 20, wherein the first power path comprises a VCC power path and wherein the second power path comprises a ground path.

22. The system of claim 21, wherein the motherboard includes an external power path coupled to provide the VCC voltage from the VRM to the VCC power path of the processor and a ground plane to provide a ground voltage to the ground path of the processor and wherein the short detect circuit is coupled to detect a second short on the motherboard between the external power path and the ground plane and generate the short signal in response.

23. The system of claim 20, further comprising a VID voltage regulator ("VID VREG") coupled to provide an early voltage prior to the VCC voltage to the VID module and to the short detect circuit.

24. The system of claim 20, wherein the short detect circuit is integrated into a die of the processor.

25. The system of claim 20, wherein the short detect circuit is external to a die including the processor and disposed within a package housing the processor die.

* * * * *